US012240415B2

(12) United States Patent
Falinski et al.

(10) Patent No.: US 12,240,415 B2
(45) Date of Patent: Mar. 4, 2025

(54) CONSOLE ELEMENT FOR A VEHICLE

(71) Applicant: Brose Fahrzeugteile SE & Co. Kommanditgesellschaft, Coburg, Coburg (DE)

(72) Inventors: Wojciech Falinski, Coburg (DE); Christian Mergl, Zeil/Main (DE); Marcel Schieber, Weidhausen bei Coburg (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 354 days.

(21) Appl. No.: 17/781,566

(22) PCT Filed: Nov. 24, 2020

(86) PCT No.: PCT/EP2020/083139
§ 371 (c)(1),
(2) Date: Jun. 1, 2022

(87) PCT Pub. No.: WO2021/110469
PCT Pub. Date: Jun. 10, 2021

(65) Prior Publication Data
US 2023/0008478 A1 Jan. 12, 2023

(30) Foreign Application Priority Data

Dec. 2, 2019 (DE) ...................... 10 2019 218 721.8

(51) Int. Cl.
*B60R 7/04* (2006.01)
*B60N 2/75* (2018.01)
*B60R 11/00* (2006.01)

(52) U.S. Cl.
CPC .................. *B60R 7/04* (2013.01); *B60N 2/77* (2018.02); *B60R 2011/0007* (2013.01)

(58) Field of Classification Search
CPC ............... B60R 7/04; B60R 2011/0005; B60R 2011/0007; B60N 2/77
(Continued)

(56) References Cited

U.S. PATENT DOCUMENTS 3,779,600 A * 12/1973 Quakenbush ............ B60N 2/77
108/147.22
4,577,821 A * 3/1986 Edmo ...................... B66F 7/065
187/269
(Continued)

FOREIGN PATENT DOCUMENTS

DE 29514230 U1 11/1995
DE 19611892 C1 9/1997
(Continued)

OTHER PUBLICATIONS

Translation of FR2963578 (Year: 2024).*

*Primary Examiner* — Jason S Morrow
(74) *Attorney, Agent, or Firm* — Dickinson Wright PLLC

(57) ABSTRACT

A console element for a vehicle, with a top assembly, a bottom assembly and an adjustment assembly, wherein the top assembly is adjustable along an adjustment axis with respect to the bottom assembly via the adjustment assembly, and the adjustment assembly has a first adjustment element, which is coupled at one end to the top assembly, and a second adjustment element, which is coupled at one end to the bottom assembly, wherein the first adjustment element is coupled pivotably to the second adjustment element at a common coupling point. The first adjustment element and the second adjustment element project in each case with a further, free end beyond the coupling point.

17 Claims, 13 Drawing Sheets

(58) Field of Classification Search
USPC ............................................ 296/24.34, 1.09
See application file for complete search history.

(56) References Cited

U.S. PATENT DOCUMENTS

| | | | | |
|---|---|---|---|---|
| 5,301,992 | A * | 4/1994 | Whitmore | B60R 5/04 |
| | | | | 296/26.1 |
| 6,003,927 | A * | 12/1999 | Korber | B60N 2/77 |
| | | | | 296/37.8 |
| 7,575,263 | B2 * | 8/2009 | Downey | B60R 7/04 |
| | | | | 224/539 |
| 10,525,893 | B2 * | 1/2020 | Lind | B60N 2/143 |
| 2009/0058152 | A1 | 3/2009 | Orlo et al. | |
| 2013/0119738 | A1 | 5/2013 | Wallis | |
| 2015/0329150 | A1 * | 11/2015 | Fliegl, Sr. | B62D 33/0276 |
| | | | | 296/26.07 |
| 2022/0266733 | A1 * | 8/2022 | Burton | B60N 2/77 |
| 2023/0294611 | A1 * | 9/2023 | Yang | B60R 7/04 |
| 2023/0311776 | A1 * | 10/2023 | Lone | B60R 7/04 |
| | | | | 296/37.1 |

FOREIGN PATENT DOCUMENTS

| | | |
|---|---|---|
| DE | 20113440 U1 | 1/2003 |
| DE | 20120959 U1 | 4/2003 |
| DE | 10161422 A1 | 6/2003 |
| DE | 102011008586 A1 | 7/2012 |
| DE | 102016100095 A1 | 7/2016 |
| DE | 202016106055 U1 | 11/2016 |
| DE | 102017105315 A1 | 10/2017 |
| DE | 102016207620 A1 | 11/2017 |
| EP | 2818361 A1 | 12/2014 |
| EP | 1989079 B1 | 8/2015 |
| EP | 3514008 A1 | 7/2019 |
| FR | 1586574 A | 2/1970 |
| FR | 2963587 A1 * | 2/2012 ............. B60N 2/464 |
| JP | 2015223850 A | 12/2015 |
| WO | 2017180891 A1 | 10/2017 |

* cited by examiner

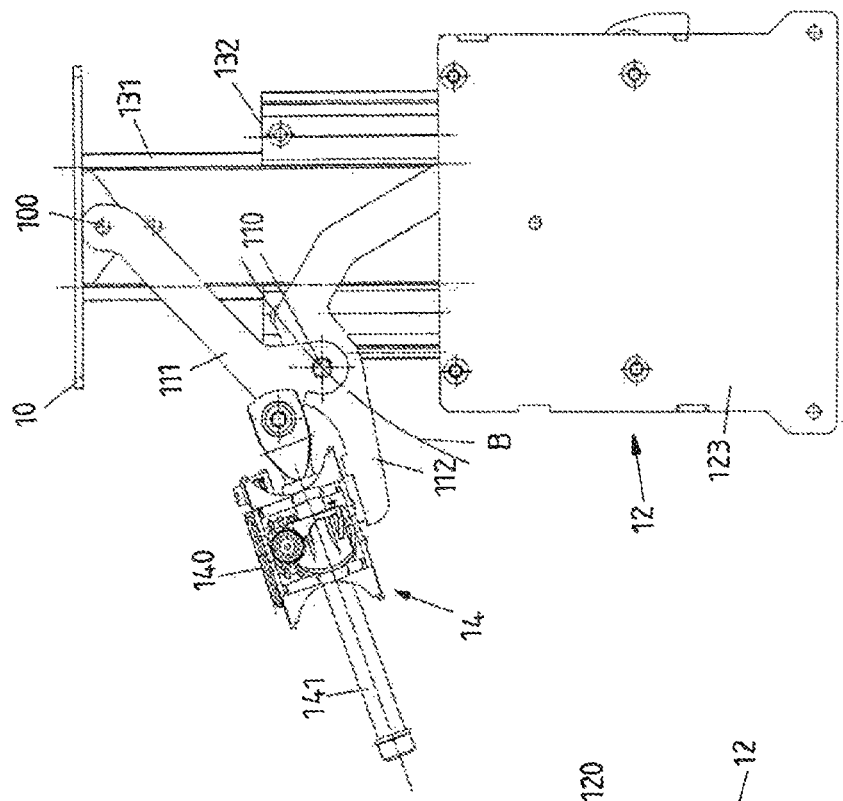
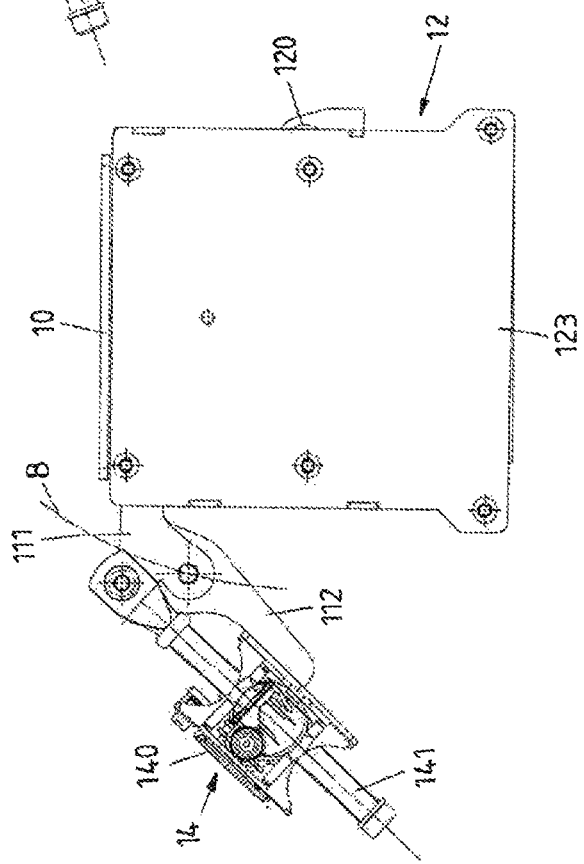

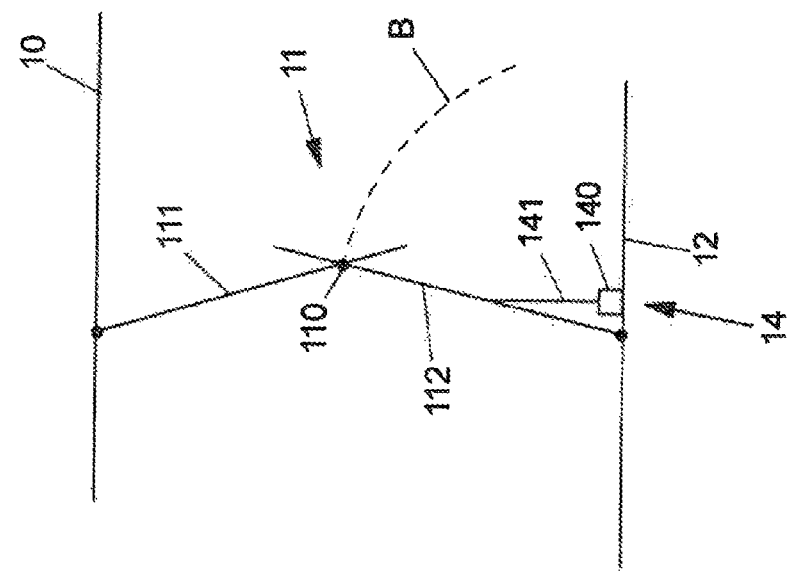
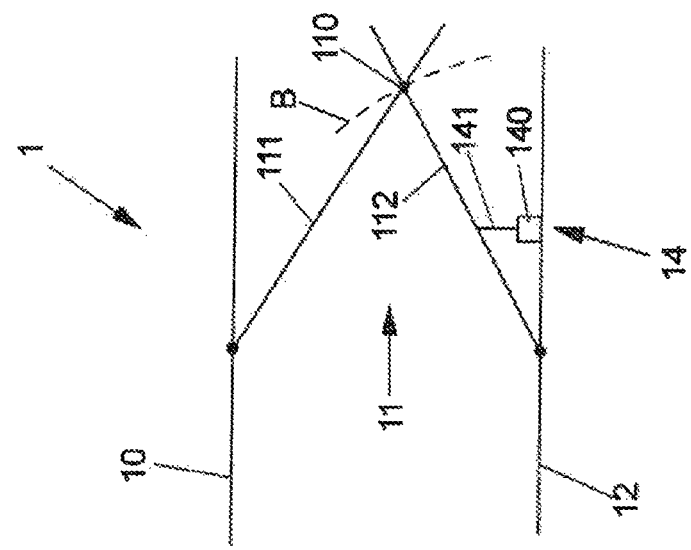

CONSOLE ELEMENT FOR A VEHICLE

CROSS-REFERENCE TO RELATED APPLICATIONS

This application is the U.S. National Phase of PCT Application No. PCT/EP2020/083139 filed on Nov. 24, 2020, which claims priority to German Patent Application No. DE 10 2019 218 721.8, filed on Dec. 2, 2019, the disclosures of which are hereby incorporated in their entirety by reference herein.

TECHNICAL FIELD

The present disclosure relates to a console element for a vehicle.

BACKGROUND

Such a console element comprises a top subassembly, a bottom subassembly and an adjustment subassembly. The top subassembly can be adjusted via the adjustment subassembly with respect to the bottom subassembly along an adjustment axis and can consequently be adapted in terms of its position. The adjustment subassembly has a first adjustment element and a second adjustment element which is pivotably coupled to the first adjustment element at a common coupling location. The first adjustment element is articulated with one end to the top subassembly and the second subassembly is articulated with one end to the bottom subassembly.

Such a console element may be used, for example, as a central console in a vehicle. Such central consoles may have a table which can be erected or an upholstered support, for example, an armrest for a vehicle passenger. The top subassembly may be able to be manually erected. The erection of the top subassembly is then complex and uncomfortable for the vehicle passenger. Alternatively, the top subassembly may be able to be erected using an electrically operated adjustment mechanism. In the context of new interior concepts for future vehicles, in particular also in connection with self-driving vehicles (so-called autonomous driving), it is desirable to provide in a vehicle one or more console elements which can be adjusted in a flexible manner and which can consequently be used in a variable manner.

SUMMARY

One or more objects of the present disclosure is to improve an apparatus, with particular regard to its flexibility.

In the console element, a first adjustment element and a second adjustment element protrude accordingly with an additional, free end beyond the coupling location. The first adjustment element and the second adjustment element may have at least one end by means of which they are articulated to the top subassembly and the bottom subassembly, and another free end, by means of which they protrude beyond the coupling location. The term "free end" may in this instance be understood to mean that the end is not arranged on a fixed structure, such as, for example, the top subassembly, the bottom subassembly or a vehicle base. The common coupling location may divide the adjustment elements in each case, such as, kinematically, into two portions which each extend at one side of the coupling location. One of the portions may be articulated to the bottom subassembly or the top subassembly, the other portion may form the additional, free end.

In one embodiment, the first adjustment element is coupled to the bottom subassembly only by means of the second adjustment element and the second adjustment element is coupled to the top subassembly only by means of the first adjustment element. The first and second adjustment elements may in principle be coupled to each other and to one of the top subassembly and bottom subassembly. For example, the first adjustment element is coupled to the second adjustment element and to the top subassembly. The first adjustment element is thus in principle not coupled directly to the bottom subassembly. The first adjustment element can naturally be coupled indirectly to the bottom subassembly by means of the second adjustment element. The second adjustment element can also be coupled to the first adjustment element and the bottom subassembly. The second adjustment element is thus in principle not connected directly to the top subassembly. The second adjustment element can naturally be coupled indirectly to the top subassembly by means of the first adjustment element.

As a result of the fact that, in the console element, the first adjustment element and the second adjustment element each protrude with another free end beyond the coupling element, the console element can be adapted in a cost-effective manner and in a short time to specifications of a structural space. As an example, the individual components of the console element can be structurally adapted in a simple and rapid manner to various vehicle variants. For example, a length of the adjustment elements can be adapted in order to produce different adjustment paths or travel paths.

The adjustment subassembly may be constructed in the manner of a knee-lever mechanism. A knee-lever mechanism may comprise three bearing locations and at least two members. The adjustment subassembly may in a similar manner comprise two adjustment elements, of which the first adjustment element is articulated to the top subassembly and to the second adjustment element and the second adjustment element is articulated to the bottom subassembly. The adjustment elements may intersect not at all or intersect an even number of times.

Alternatively, the adjustment subassembly may be constructed in the manner of a single-sided scissor lifting mechanism. The first adjustment element can be articulated to the top subassembly in a stationary manner and the second adjustment element can be articulated to the bottom subassembly in a stationary manner. The adjustment elements thus cannot be displaceable relative to the top subassembly and the bottom subassembly. Furthermore, the adjustment elements may each comprise two ends. One end of the first adjustment element may be connected to the top subassembly, whilst the other end is free. One end of the second adjustment element may be connected to the bottom subassembly, whilst the other end is also free. In a similar manner to the scissor lifting mechanism, the adjustment elements may intersect once or an odd number of times.

In both embodiments of the adjustment subassembly, in the manner of a knee-lever mechanism or in the manner of a single-sided scissor lifting mechanism, the adjustment elements may be connected at one side to the top subassembly or the bottom subassembly. The smallest possible number of bearing locations may be provided. Such bearing locations may be the top and bottom articulation locations of the adjustment elements and the coupling location of the adjustment elements to each other. As a result of the small number of bearing locations, a play (comfort play) of the adjustment subassembly can be minimized.

In one embodiment, the adjustment subassembly has an adjustment device. The adjustment device may be provided in order to adjust the adjustment subassembly. For example, the adjustment device may have a spindle drive or a pinion drive. The adjustment device may be arranged on the bottom subassembly so as to be secured to the floor or arranged on the top subassembly, for example, so as to be secured to a table.

In one embodiment, the console element has at least one guiding means subassembly which is arranged on the bottom subassembly in order to guide the top subassembly along the adjustment axis. The at least one guiding means subassembly may be provided in order to stabilize and to guide the top subassembly during the adjustment. The at least one guiding means subassembly may also be used to absorb forces on the top subassembly which are produced from the loading, for example, as a result of objects being set down. It is therefore not particularly necessary for the adjustment subassembly to be configured to absorb heavy loads. The adjustment subassembly may be configured to enable the adjustment of the top subassembly. The adjustment subassembly can thereby be constructed to be particularly light.

The at least one guiding means subassembly may be able to be adjusted along an adjustment axis. The adjustment axis may, for example, be a perpendicular to a vehicle base on which the console element is arranged. For example, the at least one guiding means subassembly may be able to be retracted and extended in the manner of a telescope.

In one embodiment, the at least one guiding means subassembly can be extended relative to the bottom subassembly in the manner of a telescope. The at least one guiding means subassembly may, for example, have at least one guiding rail which can be displaced relative to the bottom subassembly. As an example, the at least one guiding means subassembly may have telescopic guiding rails.

In one embodiment, the at least one guiding means subassembly has at least one guiding means which is supported so as to be able to be displaced along the adjustment axis relative to the bottom subassembly. The at least one guiding means may be, for example, a guiding rail. The at least one guiding means may be displaceably supported on the bottom subassembly on a bottom guiding means. The top subassembly may be arranged on the at least one guiding means so that a displacement of the top subassembly brings about a displacement of the at least one guiding means relative to the bottom subassembly. It can thereby be ensured that the top subassembly can be displaced only along the adjustment axis.

In one embodiment, the top subassembly has a storage face. The top subassembly may, for example, have a table for depositing objects, an upholstery and/or a storage compartment.

In one embodiment, the coupling location during the adjustment of the top subassembly may describe a curved adjustment path in an adjustment plane. The adjustment path of the coupling location, along which the coupling location can be moved when the top subassembly is adjusted, may for example, be constructed in a curved manner. The adjustment plane may be perpendicular relative to the top subassembly and parallel with an adjustment axis, along which the top subassembly can be adjusted. As an example, the adjustment plane may be perpendicular to the vehicle base.

In one embodiment, the free end of the adjustment elements is in each case an end which is not connected to the top subassembly or the bottom subassembly. The first and/or the second adjustment element may, for example, be constructed in an elongate or rod-like manner. For example, the first and/or the second adjustment element may be coupling rods. One end of the adjustment elements may in each case be articulated to the top subassembly or the bottom subassembly, whilst the other end is a free end. The first and/or the second adjustment element may in each case protrude with a free end beyond the coupling location in order at the free end to introduce an adjustment force or in order at the free end to arrange an adjustment device in order to produce an adjustment force.

In one embodiment, the first adjustment element protrudes with a first free end beyond the coupling location and the second adjustment element. Additionally or alternatively, the second adjustment element may protrude with a second free end beyond the coupling location and beyond the first adjustment element. The first adjustment element and the second adjustment element may consequently together form a single-sided scissor lifting mechanism. The first and the second adjustment elements may, for example, intersect each other at least once. The ends of the adjustment elements at one side of the coupling location may be articulated to the top subassembly and to the bottom subassembly. The ends of the adjustment elements at the other side of the coupling location may protrude freely beyond the coupling location and beyond the other adjustment element in each case. Such a configuration provides an opening angle at one side of the coupling location whose size is proportional to an angle between the first and the second adjustment element at the other side of the coupling location in the adjustment plane.

In an alternative embodiment, the first adjustment element protrudes with the first free end beyond the coupling location and protrudes from the second adjustment element, for example, in the adjustment plane. Additionally or alternatively, the second adjustment element may protrude with the second free end beyond the coupling location and protrude from the first adjustment element, for example, in the adjustment plane. The first adjustment element and the second adjustment element may consequently together form a knee-lever kinematic mechanism. The first and the second adjustment elements may in this instance intersect each other, for example, in a contact region which may include the coupling location. The ends of the adjustment elements at one side of the coupling location may in each case be articulated to the top subassembly and the bottom subassembly. The ends of the adjustment elements at the other side of the coupling location may in each case protrude freely over the coupling location and away from the other adjustment element in each case. Such an embodiment provides an opening angle at one side of the coupling location whose size is inversely proportional to an angle between the first and the second adjustment elements at the other side of the coupling location in the adjustment plane.

In one embodiment, the console element has an electromotive adjustment device. The electromotive adjustment device may, for example, be a pinion drive or a spindle drive. In order to adjust the top subassembly, the adjustment device may engage, for example, on the first adjustment element. The adjustment device may then be arranged, for example, on the top subassembly, the bottom subassembly or the second adjustment element. In order to adjust the top subassembly, the adjustment device may also engage on the second adjustment element. The adjustment device may then be arranged, for example, on the top subassembly, the bottom subassembly or the first adjustment element. In order to adjust the top subassembly, the adjustment device may also engage on the top subassembly itself. The adjustment device may then, for example, be arranged on the first adjustment element or on the second adjustment element. In order to adjust the top subassembly, the adjustment device may also engage on the bottom subassembly. The adjustment device may then, for example, be arranged on the first adjustment element or on the second adjustment element. Using the adjustment device, an adjustment force for adjusting the top subassembly indirectly or directly can be introduced into the top subassembly. As an example, the console element affords several possibilities for arranging the adjustment device on the console element so that the console element can be adapted in a simple manner and with relatively little complexity, for example, to different vehicle variants.

In one embodiment, the adjustment device is arranged at the first free end and engages on the second free end for adjustment of the top subassembly. Alternatively, the adjustment device may be arranged at the second free end and engage on the first free end in order to adjust the top subassembly. With the adjustment device, for example, an opening angle which the free ends form with respect to each other may be able to be changed. A change of the opening angle may be converted into an adjustment of the top subassembly.

In one embodiment, the adjustment device has a drive apparatus and a drive element which can be adjusted with the drive apparatus. The drive element may, for example, be a spindle of a spindle drive. The drive apparatus may be arranged at the first free end and the drive element may engage on the second free end. Alternatively, the drive apparatus may be arranged at the second free end and the drive element may engage on the first free end. In principle, the drive apparatus may be arranged on the first adjustment element or the second adjustment element. The drive element may engage on the other adjustment element in each case. The drive apparatus may also be arranged on the top subassembly or the bottom subassembly, wherein the drive element engages on the first or the second adjustment element.

In one embodiment, the first adjustment element has a first extension portion, which protrudes from the top subassembly in a first extension direction, and a first adjustment portion which protrudes from the first extension portion in a direction perpendicular to the first extension direction. Additionally or alternatively, the second adjustment element may have a second extension portion which protrudes from the bottom subassembly in a second extension direction and a second extension portion which protrudes from the second extension portion in a direction perpendicular to the second extension direction.

The first and/or the second adjustment portion may in each case protrude in the adjustment plane from the first and/or second extension portion. The first and/or the second extension portion and the first and/or second adjustment portion may form a right angle with respect to each other. As an example, the first and/or the second extension portion may protrude in the adjustment plane obliquely from the top subassembly and/or the bottom subassembly. The first extension portion may, for example, protrude obliquely from the top subassembly in the direction of the bottom subassembly. The second extension portion may, for example, protrude obliquely from the bottom subassembly in the direction of the top subassembly.

The coupling location may be arranged on the first adjustment portion and/or the second adjustment portion. The first adjustment element may, for example, be angled at right-angles between the top subassembly and the coupling location in the connection plane. The second adjustment element may, for example, also be angled at right-angles between the bottom subassembly and the coupling location in the connection plane.

The arrangement of the coupling location on the first adjustment portion and/or the second adjustment portion may on the first adjustment portion and/or the second adjustment portion provide a lever for adjusting the first and/or second adjustment element via the adjustment device.

In principle, the first adjustment element and the second adjustment element can be pivoted freely relative to the top subassembly and the bottom subassembly. In one embodiment, the first adjustment element and/or the second adjustment element have a stop, by means of which a pivot movement toward the top subassembly and/or the bottom subassembly can be limited. The first adjustment element may, for example, strike a first stop so that the first extension portion is spaced apart from the top subassembly at least by a minimum angle which is predetermined by the arrangement of the first stop. The second adjustment element may, for example, strike a second stop so that the second extension portion is spaced apart from the bottom subassembly at least by a minimum angle which is predetermined by the arrangement of the second stop. The first and/or the second stop may, for example, be an additional element which is arranged on the first and/or the second adjustment element. Alternatively, the first and/or the second adjustment element may have a base portion via which the first and/or the second adjustment element are articulated at the respective articulation location to the top subassembly or the bottom subassembly and from which the first and/or the second extension portion protrudes at an angle in the connection plane away from the top subassembly or the bottom subassembly. The first and/or the second adjustment element may be angled at a transition from the base portion to the extension portion so that the base portion in each case forms the stop. With the base portion, the respective adjustment element may strike the top subassembly or the bottom subassembly so that the respective extension portion cannot be adjusted beyond a predetermined minimum angle in the direction toward the top subassembly or the bottom subassembly.

There may be provided in each case on the top subassembly or the bottom subassembly a block element which cooperates with the stop in order to limit a pivot movement of the first and/or the second adjustment element in the direction toward the top subassembly or the bottom subassembly.

In one embodiment, there is provided on the console element a resilient element which supports an adjustment of the top subassembly. The resilient element may compensate, for example, for a load which acts on the top subassembly. The resilient element may in order to support the adjustment of the top subassembly engage, for example, on the first adjustment element. The resilient element may then, for example, be arranged on the top subassembly, the bottom subassembly or the second adjustment element. The resilient element may also engage on the second adjustment element in order to support the adjustment of the top subassembly. The resilient element may then, for example, be arranged on the top subassembly, the bottom subassembly or the first adjustment element. The resilient element may also engage on the top subassembly itself in order to support the adjustment of the top subassembly. The resilient element may then, for example, be arranged on the first adjustment element or on the second adjustment element. Similarly, the resilient element may engage on the bottom subassembly in order to support the adjustment of the top subassembly. The resilient element may then be arranged, for example, on the first adjustment element or on the second adjustment element. With the resilient element, an additional adjustment force in addition to the adjustment force of the adjustment element for supporting the adjustment of the top subassembly may consequently be introduced indirectly or directly into the top subassembly. A lower-powered drive apparatus for the adjustment device can thereby be used in order to save costs.

The console element may, for example, be provided for arrangement in a vehicle interior.

In one embodiment, the console element is a component of a vehicle seat arrangement having two vehicle seats between which the console element is arranged. For example, the console element may be arranged between a driver's seat and a passenger seat. A large number of console elements may be arranged in a vehicle.

In order to control the adjustment of the top subassembly, there may be provided a control device which is coupled to the adjustment device. For example, the control device may be configured to control the adjustment device in a motorized or electronic manner. The control device may, for example, include a user interface via which a vehicle passenger can have access to functions of the control device in order to adjust the top subassembly.

BRIEF DESCRIPTION OF THE DRAWINGS

The notion on which the invention is based will be explained below in greater detail with reference to the embodiments which are illustrated in the Figures, in which:

FIG. 4A shows a side view of a console element with a trim component in a first position;

FIG. 4B shows a side view of a console element with a trim component in a second position;

FIG. 7A shows a schematic view of a console element with a bottom drive apparatus in a first position;

FIG. 7B shows a schematic view of a console element with a bottom drive apparatus in a second position;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DE 20 2016 106 055 U1 discloses, for example, an armrest which can be adjusted in terms of height by means of a scissor-like frame having axles which are guided in bearings.

Figure 1A:
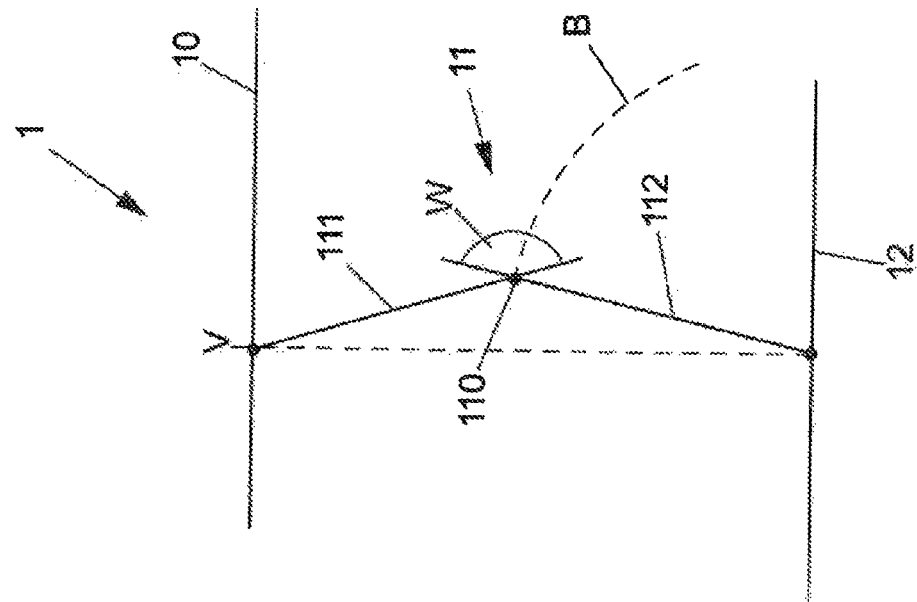
FIG. 1A shows a schematic view of a console element with crossed adjustment elements in a first position.
Figure 1B:
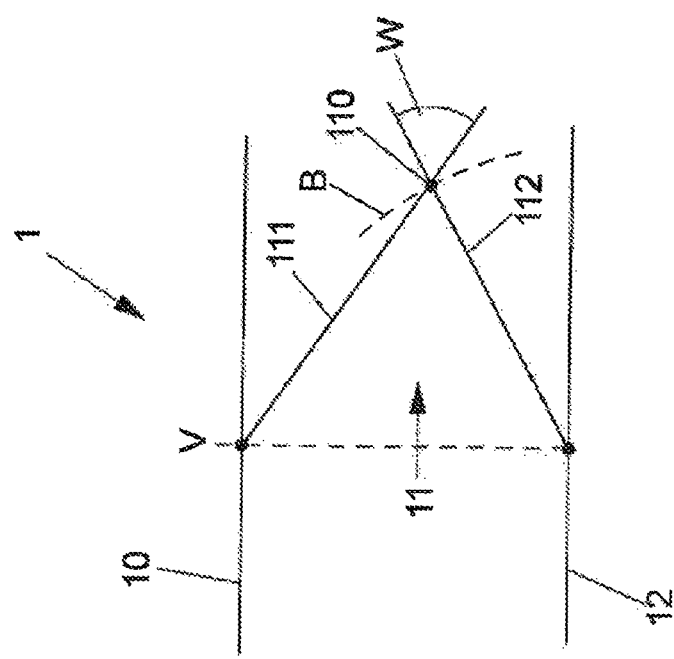
FIG. 1B shows a schematic view of a console element with crossed adjustment elements in a second position.

FIGS. 1A and 1B show schematic illustrations of a console element 1 for a vehicle having a top subassembly 10 and a bottom subassembly 12. The top subassembly 10 can be adjusted in terms of height relative to the bottom subassembly 12. The bottom subassembly 12 is arranged on a vehicle floor FB so as to be secured to the floor.

The console element 1 further has an adjustment subassembly 11. The adjustment subassembly 11 is arranged between the bottom subassembly 12 and the top subassembly 10. Via the adjustment subassembly 11, the top subassembly 10 can be adjusted relative to the bottom subassembly 12 along an adjustment axis V. For example, the top subassembly 10 may be able to be adjusted in a motorized or electronic manner. The adjustment axis V is arranged perpendicularly to the vehicle floor FB.

The adjustment subassembly 11 has a first adjustment element 111 and a second adjustment element 112 which is pivotably coupled to the first adjustment element 111. The first adjustment element 111 is articulated to an upper articulation location 100 of the top subassembly 10. The second adjustment element 112 is articulated to a bottom articulation location 120 of the bottom subassembly 12.

The first adjustment element 111 is arranged in a stationary manner on the top subassembly 10 and the second adjustment element 112 is arranged in a stationary manner on the bottom subassembly 12. The two adjustment elements 111, 112 are fixed in position. The first adjustment element 111 cannot, for example, be displaced relative to the top subassembly 10 and the second adjustment element 112 cannot, for example, be displaced relative to the bottom subassembly 12. The first adjustment element 111 and the second adjustment element 112 are articulated in a static manner to the top subassembly 10 and the bottom subassembly 12. As an example, the first adjustment element 111 and the second adjustment element 112 are rotatable and non-displaceable relative to the top subassembly 10 and the bottom subassembly 12.

The first adjustment element 111 can be pivoted relative to the top subassembly 10 and the second adjustment element 112 can be pivoted relative to the bottom subassembly 12. The first adjustment element 111 and the second adjustment 112 are coupled to each other at a common coupling location 110. At the coupling location 110, the first adjustment element 111 and the second adjustment element 112 can be pivoted relative to each other. A pivoting of the first adjustment element 111 relative to the top subassembly 10 also brings about a pivoting of the second adjustment element 112 relative to the bottom subassembly 12. A pivoting of the second adjustment element 112 relative to the bottom subassembly 12 also brings about as a result of the coupling location 110 a pivoting of the first adjustment element 111 relative to the top subassembly 10. The coupling location 110 moves when the first adjustment element 111 and the second adjustment element 112 are pivoted along an adjustment path B which is constructed in a curved manner. The adjustment path B of the coupling location 110 along which the coupling location 110 can be moved when the top subassembly 10 is adjusted is illustrated as a circular arc.

The console element 1 can be adjusted with the adjustment subassembly 11 between a first position which is illustrated in FIG. 1A and a second position which is illustrated in FIG. 1B.

In the first position, the spacing between the top subassembly 10 and the bottom subassembly 12 along the adjustment axis V is smaller than in the second position. In the second position, the top subassembly 10 is arranged higher along the adjustment axis V than in the first position relative to an adjacent vehicle seat, for example.

In the first position, the first adjustment element 111 and the second adjustment element 112 form an acute angle. In the second position, the first adjustment element 111 and the second adjustment element 112 are pivoted relative to each other so that they form an obtuse angle with each other. In principle, a first angle between the first adjustment element 111 and the second adjustment element 112 in the first position is smaller than a second angle between the first adjustment element 111 and the second adjustment element 112 in the second position.

The first and the second adjustment elements 111, 112 are arranged in the manner of a single-sided scissor lifting mechanism. The first adjustment element 111 protrudes with a first free end beyond the second adjustment element 112 and the second adjustment element 112 protrudes with a second free end beyond the first adjustment element 111 so that the two adjustment elements 111, 112 intersect each other at the coupling location 110. The adjustment elements 111, 112 may intersect each other an odd number of times. For example, the adjustment elements 111, 112 may intersect each other once or three times. The two free ends are in each case shorter than a portion of the adjustment elements 111, 112 between the respective articulation location 100, 120 and the coupling location 110.

As a result of this construction, an adjustment subassembly 11 which saves construction space and enables the longest possible adjustment path along the adjustment axis V can be produced in a simple manner.

Figure 2B:
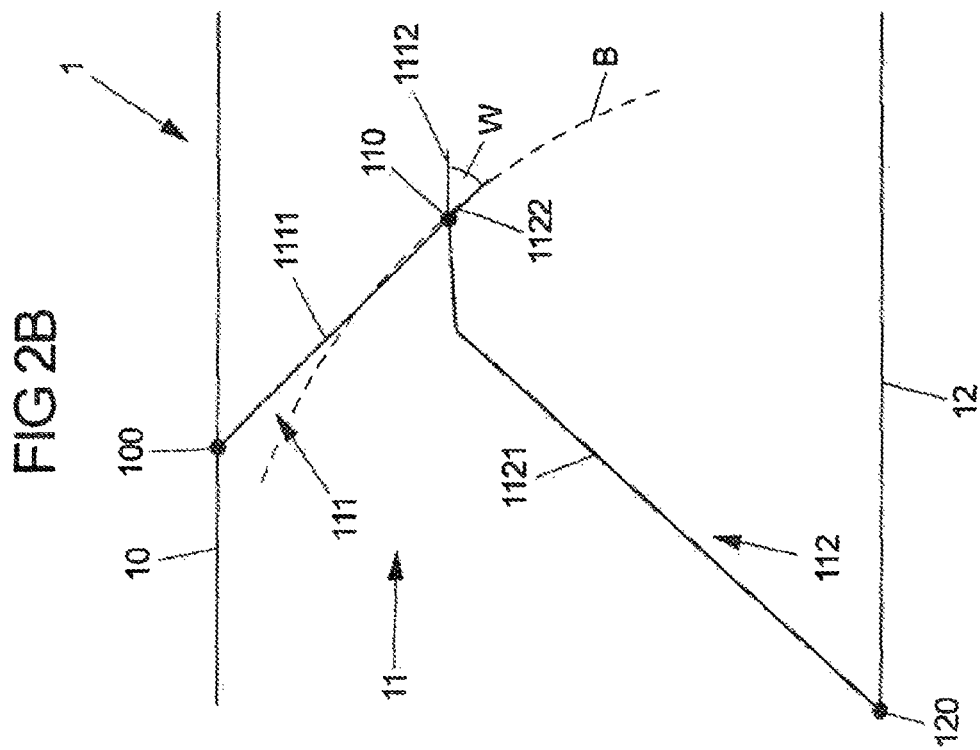
FIG. 2B shows a schematic view of a console element in a second position.
Figure 2A:
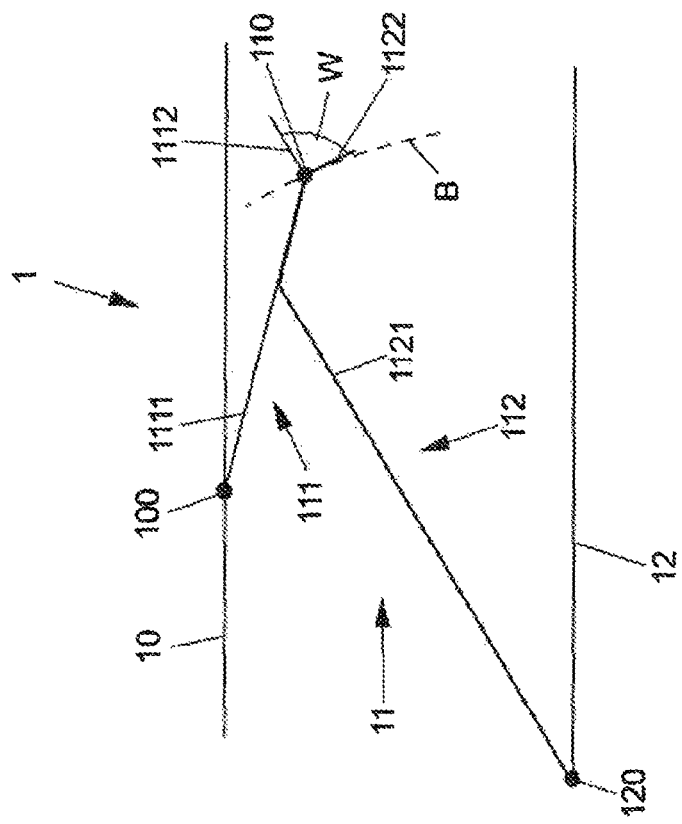
FIG. 2A shows a schematic view of a console element in a first position.

FIGS. 2A and 2B show schematic illustrations of a console element 1, wherein the first adjustment element 111 has a first extension portion 1111 which protrudes from the top subassembly 10 in a first extension direction and a first adjustment portion 1112 which protrudes from the first extension portion 1111 in a direction oblique relative to the first extension direction. The first adjustment element 111 consequently forms at least one angle. The first adjustment portion 1112 protrudes from the first extension portion 1111 at the coupling location 110. The first adjustment portion 1112 forms a first free end on the first adjustment element 111. The first adjustment element 111 extends from the upper articulation location on the top subassembly 10 beyond the coupling location 110 to the first free end.

The second adjustment element 112 has a second extension portion 1121 which protrudes from the bottom subassembly 12 in a second extension direction and a second adjustment portion 1122 which protrudes from the second extension portion 1121 in a direction perpendicular to the second extension direction. The second adjustment element 112 is constructed in an L-shaped manner. The free ends in each case extend from the coupling location 110 in the direction of the articulation location of the respective adjustment element 111, 112. The adjustment elements 111, 112 can intersect each other an even number of times. For example, the adjustment elements 111, 112 intersect each other not at all or twice. The first free end protrudes at the top side from the coupling location 110 and the second free end protrudes at the base side from the coupling location 110. In a first position of the console element 1, the first adjustment portion 1112 or the first free end extends parallel with the second extension direction.

In a variant which is not illustrated, the first adjustment element 111 is constructed in an L-shaped manner and the second adjustment portion 1122 protrudes from the second extension portion 1121 in a direction oblique relative to the second extension direction.

In the present embodiment, the coupling location 110 is arranged on the second adjustment portion 1122. The second adjustment portion 1122 comprises a second free end which protrudes from the coupling location 110. The second adjustment element 112 extends from the lower articulation location on the bottom subassembly 12, via the second extension portion 1121, the second adjustment portion 1122 and the coupling location 110 to the second free end.

The first free end and the second free end protrude from the coupling location 110. The size of an opening angle W between the free ends is dependent on a position of the console element 1. In the first position which is illustrated in FIG. 2A, the opening angle W is larger than in the second position of the console element 1 which is illustrated in FIG. 2B. The opening angle W and the angle between the adjustment elements 111, 112 at the articulation locations 100, 120 are inversely proportional with respect to each other.

Figure 3A:
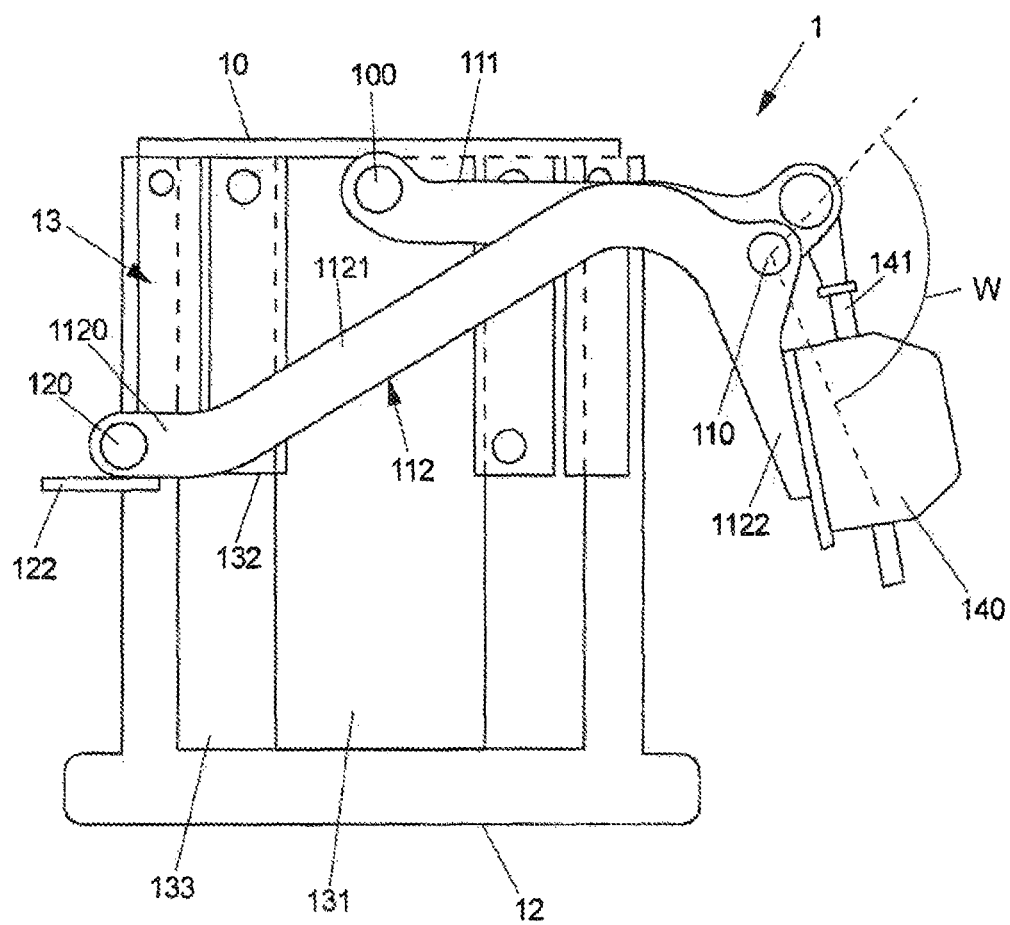
FIG. 3A shows a side view of a console element in a first position.

In the embodiment illustrated in FIG. 3A, an electromotive adjustment device 14 is arranged at the second free end. In order to adjust the top subassembly 10, the adjustment device 14 engages on the first free end. The adjustment device 14 is configured to change the opening angle W between the first free end and the second free end in order to adjust the adjustment subassembly 11. When the opening angle W is decreased, the top subassembly 10 is adjusted along the adjustment axis V away from the bottom subassembly 12. When the opening angle W is increased, the top subassembly 10 is adjusted along the adjustment axis V in the direction toward the bottom subassembly 12. When the adjustment elements 111, 112 are arranged with respect to each other in the manner of a single-sided scissor lifting mechanism, a decrease of the opening angle W brings about an adjustment of the top subassembly 10 in the direction toward the bottom subassembly 12 and an increase of the opening angle W brings about an adjustment of the top subassembly 10 away from the bottom subassembly 12.

The adjustment elements 111, 112 also comprise in this embodiment, as in the previous embodiment, an extension portion 1111, 1121 and an adjustment portion 1112, 1122. The adjustment device 14 is arranged on the second adjustment portion 1122 of the second adjustment element 112. Alternatively, the adjustment device 14 may be arranged on the first adjustment portion 1112 of the first adjustment element 111.

The adjustment device 14 comprises a drive apparatus 140 and a drive element 141 which can be adjusted relative to the drive apparatus 140. The drive element 141 is articulated to the first free end. The adjustment device 14 is in the form of a spindle drive. The drive element 141 is a spindle. The adjustment device 14 is kinematically connected to the second adjustment element 112. It thus also moves with the second adjustment element 112.

In principle, the adjustment device 14 can also be arranged at the first free end of the first adjustment element 111. For example, the first adjustment element 111 may have a first extension portion 1111 and a first adjustment portion 1112 which extends in a direction which extends perpendicularly to the extension direction of the first extension portion 1111. The adjustment device 14 may be arranged on the first adjustment portion 1112. As a result of the arrangement of the adjustment device 14 on the adjustment subassembly 11, the console element 1 may take up a particularly small amount of structural space. In principle, the adjustment device 14 may also be arranged on the top subassembly 10 or on the bottom subassembly 12.

The console element 1 further comprises a guiding means subassembly 13 which is arranged on the bottom subassembly 12 in order to guide the top subassembly 10 along the adjustment subassembly 11. The adjustment subassembly 11 provides a drive force for adjusting the top subassembly 10 along the adjustment axis V. Via the guiding means subassembly 13, the top subassembly 10 is guided during the adjustment by the adjustment subassembly 11 along the adjustment axis V.

The guiding means subassembly 13 has three guiding means 131, 132, 133 which can be fitted one inside the other in the manner of a telescope. A first guiding means 131 is received in a second guiding means 132 which in turn is received in a third guiding means 133. The third guiding means 133 is received in a bottom guiding means 121 of the bottom subassembly 12. It can be displaced along the bottom guiding means 121 relative to the bottom subassembly 12. The first guiding means 131 is arranged on the top subassembly 10. When the console element 1 is adjusted from the first position into the second position, the first guiding means 131 is displaced along the adjustment axis V relative to the second guiding means 132 and the second guiding means 132 is displaced along the adjustment axis V relative to the third guiding means 133. The third guiding means 133 is in turn displaced along the adjustment axis V relative to the bottom guiding means 121. The guiding means 121, 131, 132, 133 have guiding rails for guiding one on the other.

An adjustment of the console element 1 in a direction away from the bottom subassembly 12 is carried out by the drive element 141 being adjusted by the drive apparatus 140 from the first free end of the first adjustment element 11 in the direction toward the drive apparatus 140. The opening angle W between the first free end and the second free end is thereby reduced. At the extension portions 1111, 1121 of the adjustment elements 111, 112, as a result of the reduction of the opening angle W at the free ends, an angle between the first and the second adjustment element 111, 112 is increased. The top subassembly 10 moves along the adjustment axis V predetermined by the guiding means subassembly 13 away from the bottom subassembly 12. As a result of the adjustment subassembly 11, the top subassembly 10 is moved along the adjustment axis V. The guiding means subassembly 13 extends in a telescopic manner.

Figure 3B:
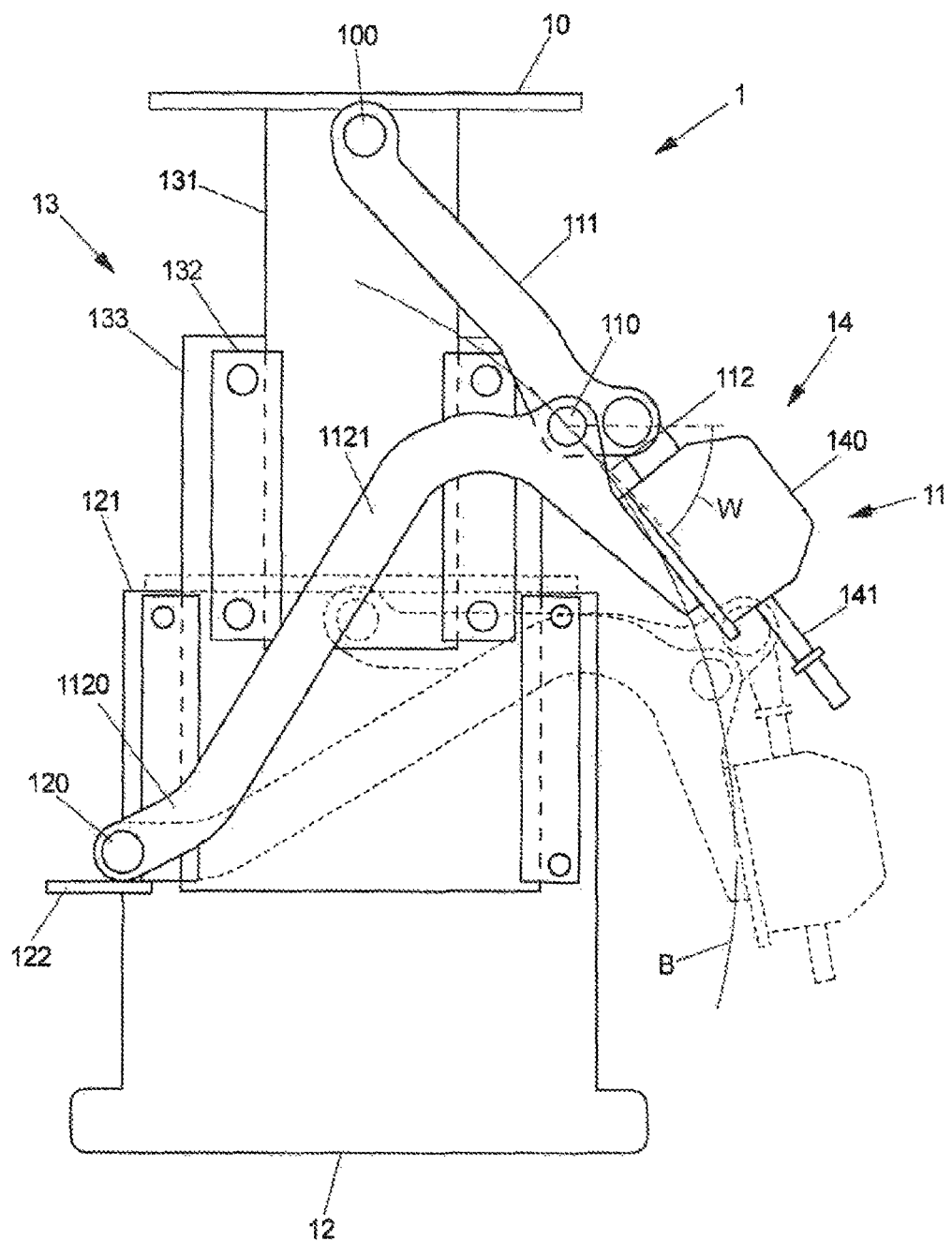
FIG. 3B shows a side view of a console element in a second position.

FIG. 3B illustrates a second position of the console element 1, in which the guiding means subassembly 13 is fully extended. An arrangement of the adjustment elements 111, 112 and the adjustment device 14 in the first position according to FIG. 3A is indicated with dashed lines. Starting from the first position, the coupling location 110 has moved along a curved adjustment path B away from the bottom subassembly 12. The first free end and the drive apparatus 140 are spaced closely with respect to each other in contrast to the first position.

The second adjustment element 112 has a stop by means of which a pivot movement of the second adjustment element 112 in the direction toward the bottom subassembly 12 can be limited. The stop is constructed as a base portion 1120, via which the second adjustment element 112 is articulated to the bottom subassembly 12. Starting from the base portion 1120, the second extension portion 1121 extends in an extension direction. The second extension portion 1121 is arranged in a direction oblique with respect to the base portion 1120. When the second adjustment element 112 is adjusted in the direction toward the bottom subassembly 12, the base portion 1120 strikes a block element 122 of the bottom subassembly 12. The base portion 1120 is arranged parallel with the vehicle base FB when striking the block element 122. The second extension portion 1121 extends at an angle with respect to the vehicle base FB. In this first position, a height of the top subassembly 10 is minimal.

FIGS. 4A and 4B show illustrations of the console element 1 in a first position and in a second position. The guiding means subassembly 13 is covered with a trim component 123 of the bottom subassembly 12. A portion of the adjustment subassembly 11 protrudes beyond the trim component 123. The adjustment subassembly 11 consequently enables a compact construction of the console element 1 with an adjustment mechanism having an increased adjustment range. In the second position, the first guiding means 131 and the second guiding means 132 protrude beyond the trim component 123.

Figure 5A:
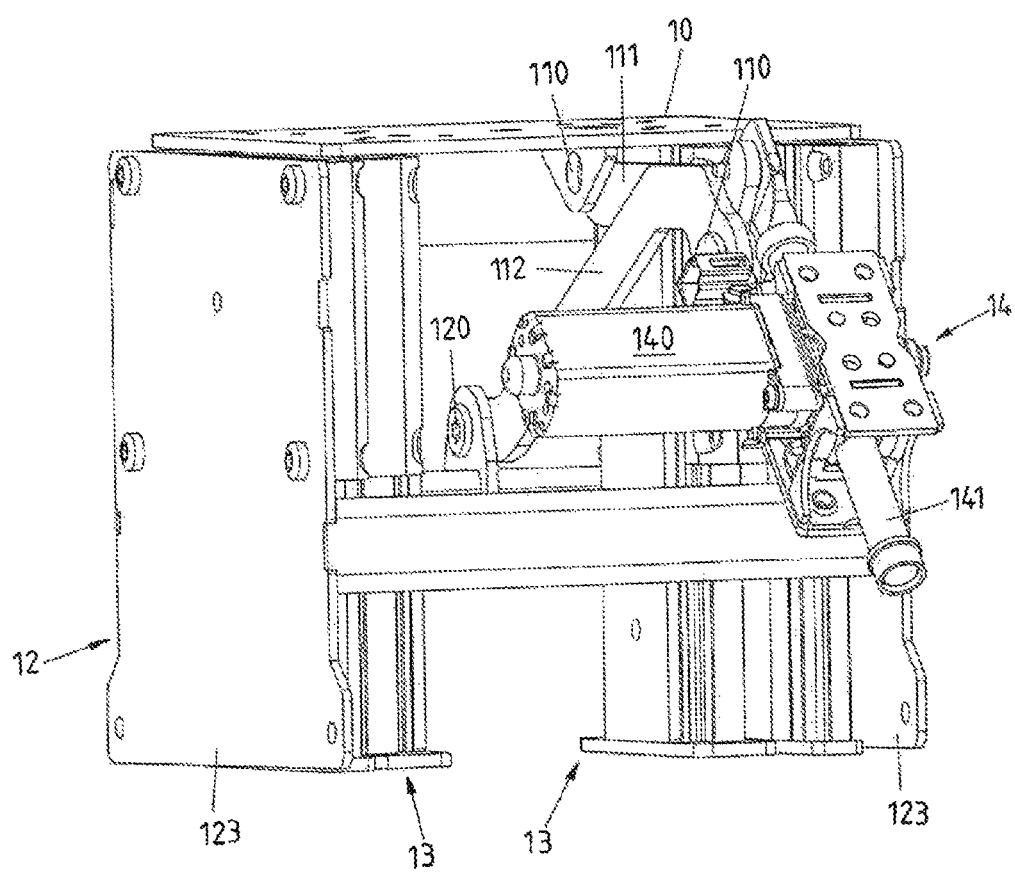
FIG. 5A shows a view of a console element in a first position.

FIG. 5A shows a console element 1 in a first position. The upper articulation location 100 is formed by means of a plate element on the top subassembly 10. The first adjustment element 111 is articulated to the plate element. The top subassembly 10 is displaceably supported on the bottom subassembly 12 by means of two guiding means subassemblies 13. The guiding means subassemblies 13 are constructed symmetrically relative to an adjustment plane in which the first and the second adjustment elements 111, 112 can be adjusted. A stable guiding of the top subassembly 10 during the adjustment by the adjustment subassembly 11 is thereby possible.

Figure 5B:
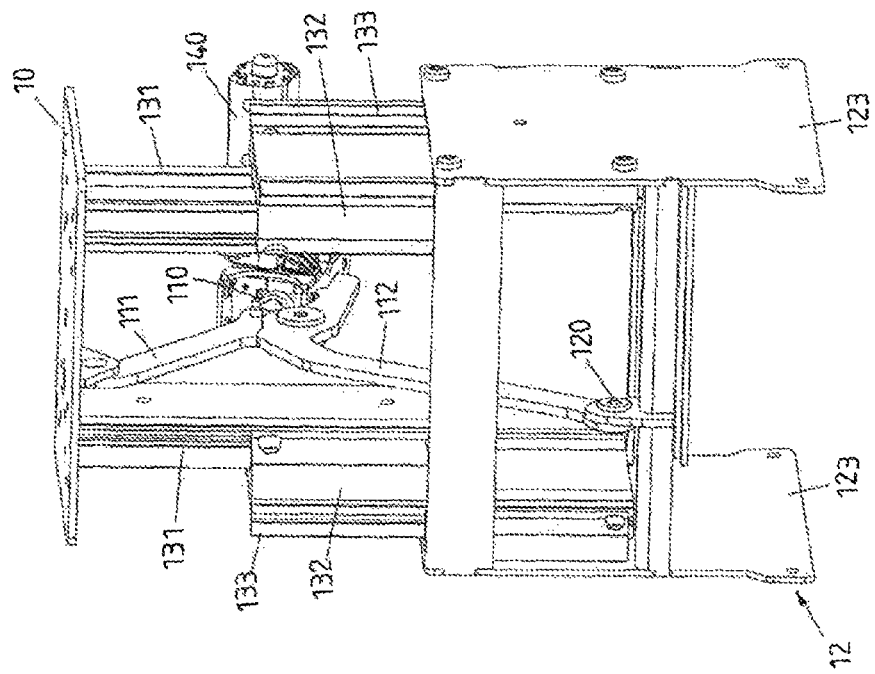
FIG. 5B shows a first view of a console element in a second position.
Figure 5C:
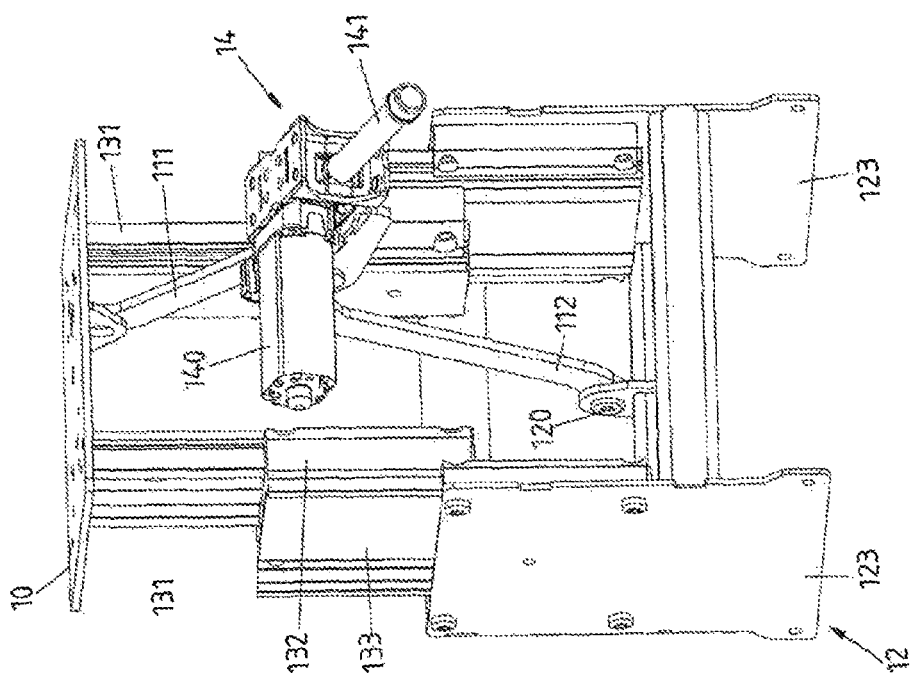
FIG. 5C shows a second view of a console element in a second position.

A trim component 123 of the bottom subassembly 12 is arranged in each case on the two guiding means subassemblies 13 so that the guiding means subassemblies 13 are at least partially covered. FIGS. 5B and 5C show two views of the console element 1 in the second position. The guiding means subassembly 13 is extended to the maximum extent.

Figure 6A:
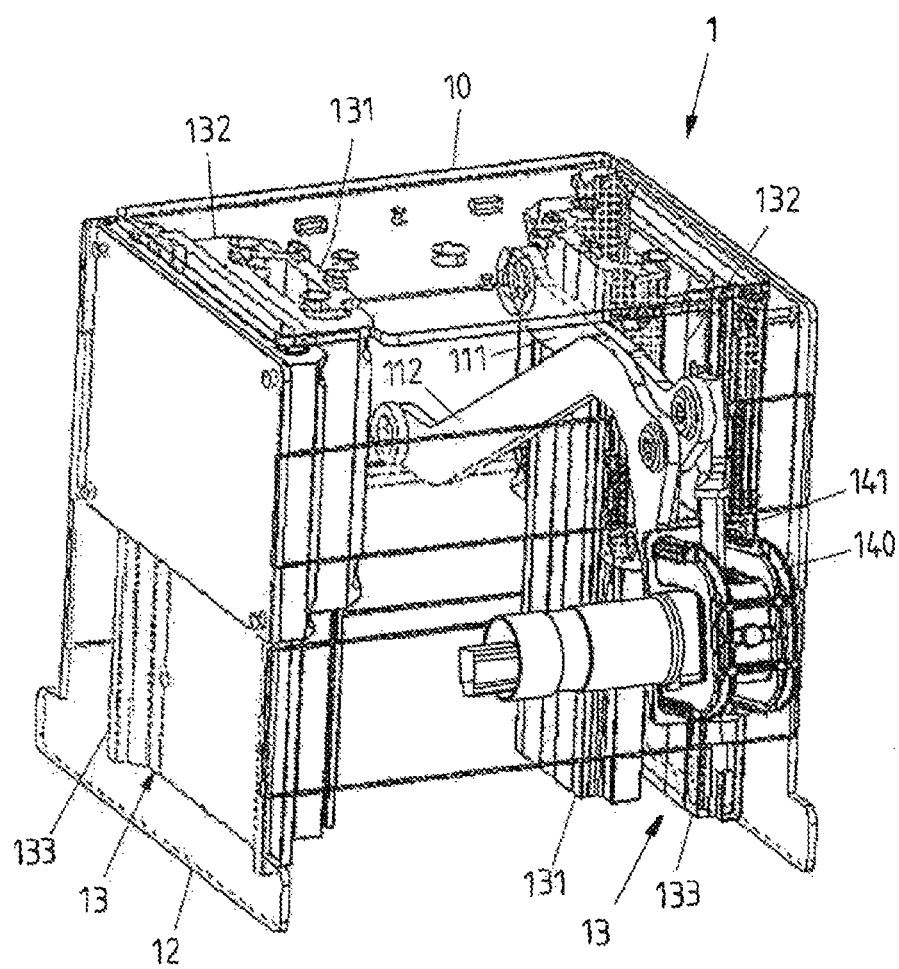
FIG. 6A shows a view of a console element in a first position.
Figure 6B:
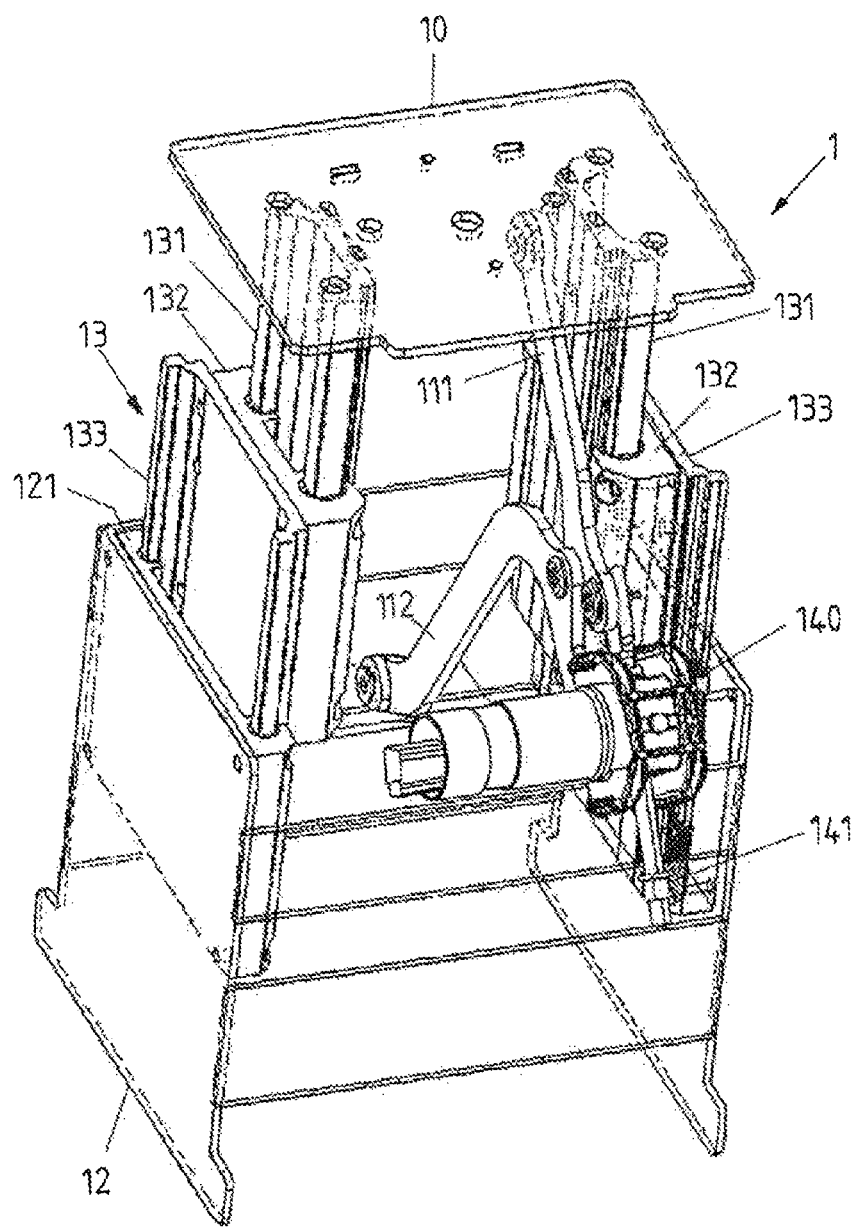
FIG. 6B shows a view of a console element in a second position.

FIG. 6A and FIG. 6B show two additional views of the console element 1 in a first position and a second position. The guiding means 131, 132, 133 of the guiding means subassembly 13 are fitted one inside the other. The two first guiding means 131 are in each case received in the second guiding means 132. The second guiding means 132 are at least partially received in the third guiding means 133. The third guiding means 133 are received on lower guiding means 121 of the bottom subassembly 12. A telescopic height adjustment of the guiding means subassembly 13 is thereby enabled.

FIG. 7A and FIG. 7B show an embodiment, in which the adjustment device 14 is arranged on the bottom subassembly 12. The adjustment device 14 engages on the second adjustment element 12 in order to adjust the top subassembly 10. As an example, the adjustment device 14 engages on the second extension portion 1121 between the lower articulation location 120 of the second adjustment element 112 and the coupling location 110 between the second adjustment element 112 and the first adjustment element 111. The adjustment device 14 comprises a drive apparatus 140 and a drive element 141. Using the drive apparatus 140, the drive element 141 can be adjusted relative to the bottom subassembly 12. The drive element 141 is further articulated to the second adjustment element 112. The adjustment of the drive element 141 away from the bottom subassembly 12 directly brings about a pivoting of the second adjustment element 112 relative to the bottom subassembly 12.

Figure 7C:
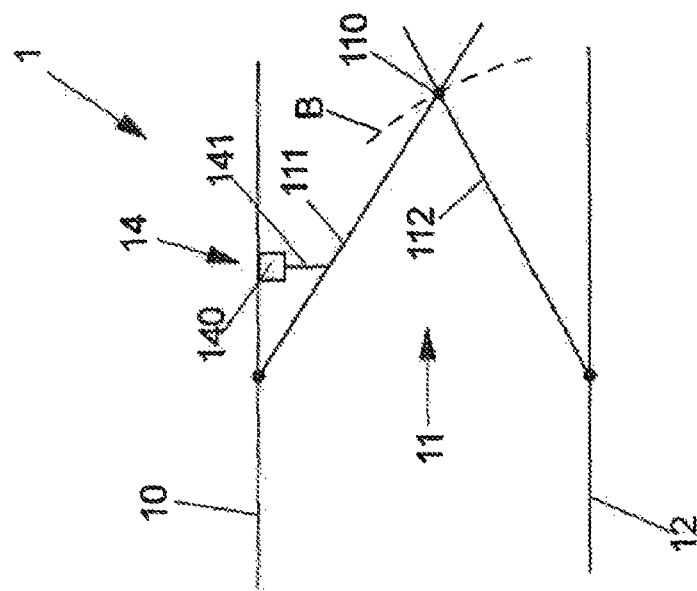
FIG. 7C shows a schematic view of a console element with a top drive apparatus in a first position.
Figure 7D:
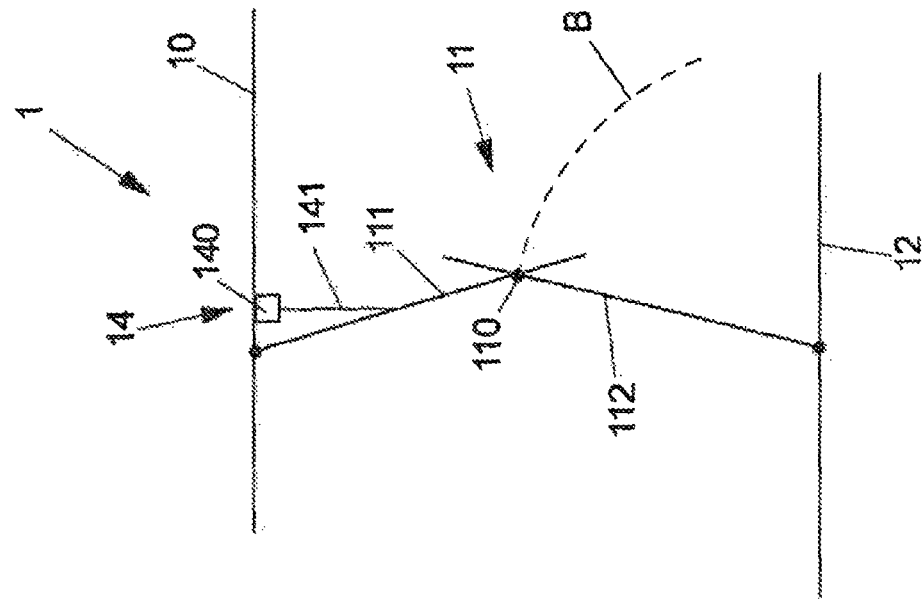
FIG. 7D shows a schematic view of a console element with a top drive apparatus in a second position.

In a variant according to FIG. 7C and FIG. 7D, the drive apparatus 140 is arranged on the top subassembly 10 and engages on the first adjustment element 111. Using the drive apparatus 140, the first adjustment element 111 can thereby be directly adjusted relative to the top subassembly 10, whereby an adjustment of the top subassembly 10 is brought about.

In one embodiment according to FIGS. 8A to 8D, a resilient element 15 which supports an adjustment of the top subassembly 10 is provided.

Figure 8A:
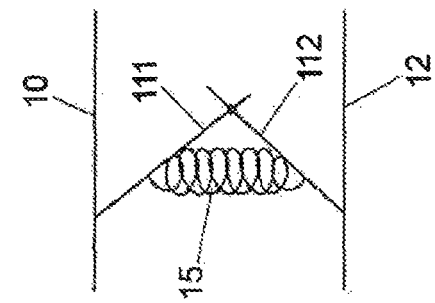
FIG. 8A shows a schematic view of a console element with a resilient element between a top subassembly and a bottom subassembly.

FIG. 8A shows an embodiment in which the resilient element 15 is arranged on the bottom subassembly 12 and engages on the top subassembly 10. For example, the resilient element 15 may be compressed in a first position of the console element 1 so that stored resilient energy can be used during adjustment from the first position into the second position as a support for the adjustment of the top subassembly 10.

Figure 8B:
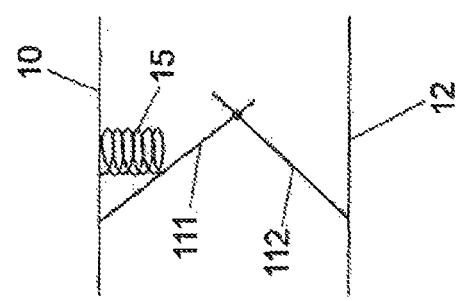
FIG. 8B shows a schematic view of a console element with a bottom resilient element.

FIG. 8B shows an embodiment in which the resilient element 15 is arranged on the bottom subassembly 12 and engages on the second adjustment element 112. The resilient element 15 supports a pivoting of the second adjustment element 112 relative to the bottom subassembly 12. For example, the resilient element 15 may be compressed in the first position. When the second adjustment element 112 is pivoted relative to the bottom subassembly 12 in order to adjust the top subassembly 10 into the second position, the resilient element 15 can support the adjustment of the second adjustment element 112 and thereby also support the adjustment of the top subassembly 10.

Figure 8C:
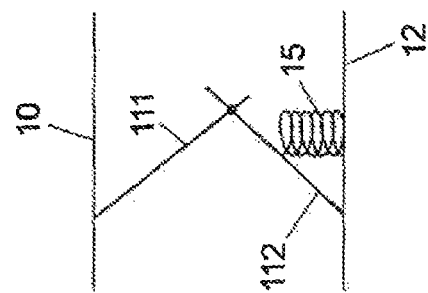
FIG. 8C shows a schematic view of a console element with a top resilient element.

According to FIG. 8C, the resilient element 15 is arranged on the top subassembly 10. The resilient element 15 engages on the first adjustment element 111. It can thereby, for example, support a pivoting of the first adjustment element 111 away from the top subassembly 10. An adjustment of the top subassembly 10 can thereby be supported.

Figure 8D:
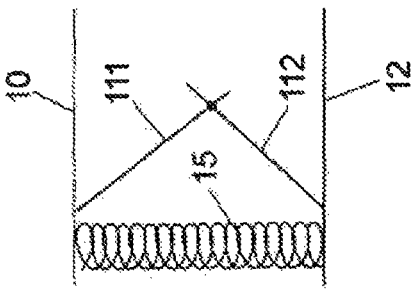
FIG. 8D shows a schematic view of a console element with a resilient element between adjustment elements.

In one embodiment according to FIG. 8D, the resilient element 15 is arranged on the first adjustment element 111. It engages on the second adjustment element 112. The increase of the angle between the first and the second adjustment elements 111, 112 at the articulation locations 100, 120 can thereby be supported.

Figure 9:
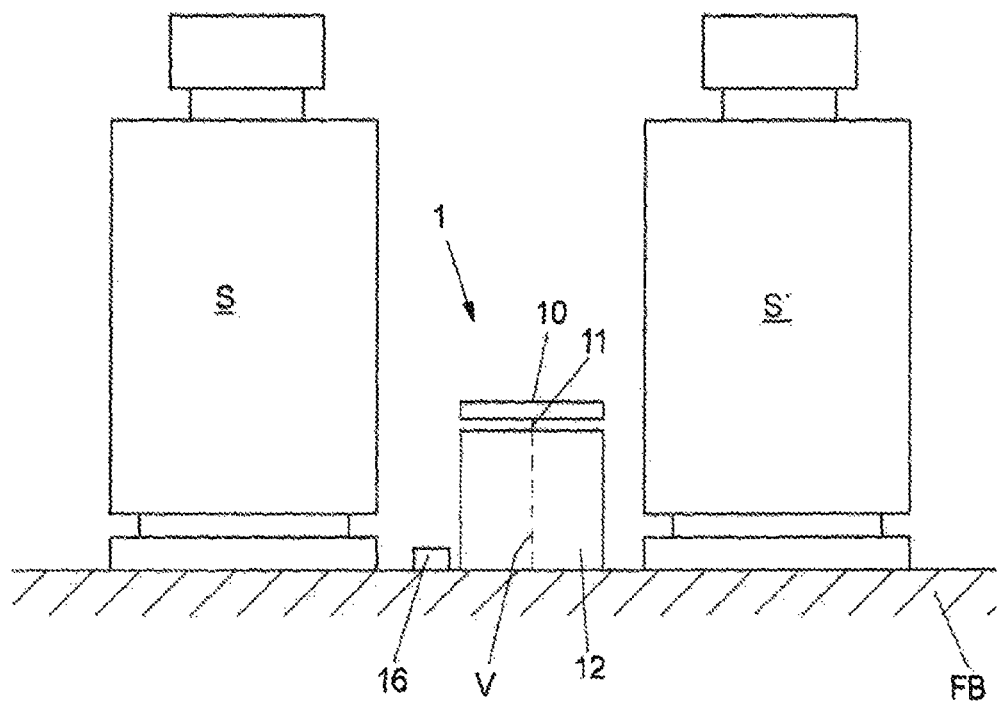
FIG. 9 shows a view of a vehicle seat arrangement having a console element.

FIG. 9 shows a vehicle seat arrangement having two vehicle seats S, S' between which a console element 1 is arranged. The console element 1 has a top subassembly 10 and a bottom subassembly 12 which is arranged on a vehicle base FB of the vehicle. The top subassembly 10 can be adjusted relative to the bottom subassembly 12 along an adjustment axis V. As an example, the top subassembly 10 can be adjusted in terms of height relative to the vehicle base FB.

In order to adjust the top subassembly 10, an adjustment subassembly 11 is provided. The adjustment subassembly 11 is coupled to a control device 16. Via the control device 16, the adjustment of the top subassembly 10 can be controlled. The adjustment of the top subassembly 10 can, for example, be controlled mechanically or electronically.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 Console element
10 Top subassembly
100 Upper articulation location
11 Adjustment subassembly
110 Coupling location
111, 112 Adjustment element
1120 Base portion
1111, 1121 Extension portion
1112, 1122 Adjustment portion
12 Bottom subassembly
120 Lower articulation location
121 Lower guiding means
122 Block element
123 Trim component
13 Guiding means subassembly
31, 132, 133 Guiding means
14 Adjustment device
140 Drive apparatus
141 Drive element
15 Resilient element
16 Control device
B Adjustment path
FB Vehicle base
S, S' Motor vehicle seat
V Adjustment axis
W Opening angle While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A console element for use in a vehicle, the console element comprising:
a top subassembly;
a bottom subassembly; and
an adjustment subassembly, the top subassembly configured to be adjusted via the adjustment subassembly with respect to the bottom subassembly along an adjustment axis, the adjustment subassembly includes a first adjustment element configured to articulate at a first end with respect to the top subassembly, and a second adjustment element configured to articulate at a second end with respect to the bottom subassembly, wherein the first adjustment element is pivotably coupled to the second adjustment element at a common coupling location, wherein the first adjustment element and the second adjustment element each include a free end protruding beyond the coupling location, wherein the free end of the adjustment elements is in each case an end which is not arranged on the top subassembly or the bottom subassembly.

2. The console element of claim 1, further comprising:

at least one guiding means subassembly arranged on the bottom subassembly and configured to guide the top subassembly along the adjustment axis.

3. The console element of claim 2, wherein the at least one guiding means subassembly is configured to be extended relative to the bottom subassembly in a telescopic manner.

4. The console element of claim 2, wherein the at least one guiding means subassembly includes at least one guiding means supported such that the at least one guiding means subassembly is displaceable along the adjustment axis relative to the bottom subassembly.

5. The console element of claim 1, wherein the top subassembly includes a storage face.

6. The console element of claim 1, wherein the first adjustment element is coupled to the bottom subassembly only via the second adjustment element, and the second adjustment element is coupled to the top subassembly only via the first adjustment element.

7. The console element of claim 1, wherein the coupling location is configured to move along an adjustment path as the top subassembly is adjusted, wherein the adjustment path is curved.

8. The console element of claim 1, wherein the first adjustment element includes a first free end protruding beyond the coupling location and the second adjustment element and/or the first adjustment element includes a second free end protruding beyond the coupling location and the second adjustment element.

9. The console element of claim 1, wherein the first adjustment element includes a first free end protruding beyond the coupling location and protrudes from the second adjustment element and/or the second adjustment element protrudes with a second free end beyond the coupling location and protrudes from the first adjustment element.

10. A console element for use in a vehicle, the console element comprising:

a top subassembly;

a bottom subassembly; and an adjustment subassembly, the top subassembly configured to be adjusted via the adjustment subassembly with respect to the bottom subassembly along an adjustment axis, the adjustment subassembly includes a first adjustment element configured to articulate at a first end with respect to the top subassembly, and a second adjustment element configured to articulate at a second end with respect to the bottom subassembly, wherein the first adjustment element is pivotably coupled to the second adjustment element at a common coupling location, wherein the first adjustment element and the second adjustment element each include a free end protruding beyond the coupling location, wherein the console element further comprises an electromotive adjustment device configured to engage the first adjustment element, the second adjustment element, at the top subassembly or at the bottom subassembly in order to adjust the top subassembly, wherein the electromotive adjustment device is arranged at a first free end of the first adjustment element and engages a second free end of the second adjustment element in order to adjust the top subassembly, or the electromotive adjustment device is arranged at the second free end of the second adjustment element and engages the first free end in order to adjust the top subassembly.

11. The console element of claim 10, wherein the electromotive adjustment device is arranged on the second adjustment element, on the first adjustment element, on the bottom subassembly, or on the top subassembly.

12. The console element of claim 10, wherein the electromotive adjustment device includes a spindle drive or a pinion drive.

13. The console element of claim 10, wherein the adjustment device includes a drive apparatus arranged at the first free end or the second free end, and a drive element engages the other free end, respectively, and the drive element is configured to be adjusted by the drive apparatus.

14. A console element for use in a vehicle, the console element comprising:

a top subassembly;

a bottom subassembly; and an adjustment subassembly, the top subassembly configured to be adjusted via the adjustment subassembly with respect to the bottom subassembly along an adjustment axis, the adjustment subassembly includes a first adjustment element configured to articulate at a first end with respect to the top subassembly, and a second adjustment element configured to articulate at a second end with respect to the bottom subassembly, wherein the first adjustment element is pivotably coupled to the second adjustment element at a common coupling location, wherein the first adjustment element and the second adjustment element each include a free end protruding beyond the coupling location, wherein the first adjustment element includes a first extension portion, protruding from the top subassembly in a first extension direction, and a first adjustment portion protruding from the first extension portion in a direction perpendicular to the first extension direction, or wherein the second adjustment element includes a second extension portion protruding from the bottom subassembly in a second extension direction, and a second adjustment portion protruding from the second extension portion in a direction perpendicular to the second extension direction.

15. The console element of claim 14, wherein the coupling location is arranged on the first adjustment portion or the second adjustment portion.

16. The console element of claim 1, wherein the first adjustment element and/or the second adjustment element includes a stop configured to limit pivotal movement of the first adjustment element and/or the second adjustment element in a direction toward the top subassembly and/or the bottom subassembly.

17. The console element of claim 1, further comprising:

a resilient element configured to support an adjustment of the top subassembly.

* * * * *